United States Patent
Aas et al.

(10) Patent No.: US 7,343,047 B2
(45) Date of Patent: Mar. 11, 2008

(54) SYSTEMS AND METHODS FOR ARRIVING AT AN AUTO FOCUS FIGURE OF MERIT

(75) Inventors: Eric F. Aas, Windsor, CO (US); Gregory V. Hofer, Loveland, CO (US); Casey L. Miller, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 638 days.

(21) Appl. No.: 10/946,771

(22) Filed: Sep. 22, 2004

(65) Prior Publication Data

US 2006/0062484 A1  Mar. 23, 2006

(51) Int. Cl.
*G06K 9/40* (2006.01)
*H04N 5/232* (2006.01)

(52) U.S. Cl. .................. 382/255; 382/274; 348/345
(58) Field of Classification Search ............... 382/255, 382/260–266, 269, 274, 275, 312; 348/252, 348/345, 353, 360, 365
See application file for complete search history.

(56) References Cited

U.S. PATENT DOCUMENTS

| | | | |
|---|---|---|---|
| 5,715,335 A * | 2/1998 | De Haan et al. ............ 382/265 |
| 5,880,777 A | 3/1999 | Savoye et al. | |
| 6,101,287 A | 8/2000 | Corum et al. | |
| 6,452,633 B1 | 9/2002 | Merrill et al. | |
| 6,456,328 B1 * | 9/2002 | Okada ...................... 348/699 |
| 6,614,474 B1 * | 9/2003 | Malkin et al. ............. 348/252 |
| 6,628,330 B1 * | 9/2003 | Lin ............................ 348/252 |
| 6,714,258 B2 | 3/2004 | Stessen et al. | |
| 2002/0191973 A1 | 12/2002 | Hofer et al. | |

* cited by examiner

*Primary Examiner*—Kanjibhai Patel

(57) ABSTRACT

A method comprises detecting edges in at least a region of a captured focus image, using adjacent pixels of the region to obtain first edge detection results and filtering the first edge detection results. The first filtering comprises comparing differences in pixel contrast in the first edge detection results with a first threshold value and removing the differences in pixel contrast that are less than the first threshold value from the first edge detection results. The method further comprises detecting edges in at least the region, using non-adjacent pixels of the region to obtain second edge detection results and filtering the second edge detection results. The second filtering comprising comparing differences in pixel contrast in the second edge detection results with a second threshold value and removing the differences in pixel contrast that are less than the second threshold value from the second edge detection results.

36 Claims, 2 Drawing Sheets

SYSTEMS AND METHODS FOR ARRIVING AT AN AUTO FOCUS FIGURE OF MERIT

FIELD OF THE INVENTION

This disclosure is broadly related to imaging and more specifically to systems and methods for arriving at an auto focus Figure of Merit (FOM).

DESCRIPTION OF RELATED ART

For digital cameras, focus is typically accomplished using image information captured through the use of the camera's photo sensor, imaging component or light-sensitive integrated circuit, such as an area charge-coupled device (CCD) used to capture images. Use of image information captured by the camera's area CCD eliminates the need and expense for a separate photo sensor dedicated to focusing. By contrast, film cameras typically employ a separate photo sensor, such as a linear CCD, that is used separately for focusing. In performing auto focus calculations or determinations, a common goal is to gather or maximize the contrast between adjacent pixels in the array of pixels captured using an area CCD. The theory behind such use of electronic images for focusing is that a sharp line in an image will provide a large degree of contrast at a sharpest focus. Conversely, if an image is blurred, much less of a difference is present between adjacent pixels along an edge. Typically, auto focus algorithms examine a region of an image, typically in the center of the image. This region is typically evaluated to find a degree of pixel contrast difference that would indicate edges within this region. Numerous methods are known to those of ordinary skill in the art for calculating an edge. These methods for calculating an edge are commonly known in the art as "edge detectors."

Typically, an auto focus algorithm will compare a plurality of focusing images provided at multiple positions of focus, such as provided by the camera's focus motor stepping through lens focus positions, changing the focus point for each of these images. A calculation is preformed on a region of each of these focusing images to provide a Figure of Merit (FOM). This FOM calculation typically includes an edge detection algorithm across the region and a summation of all of the resulting values. Typically the image representing the lens focus position which provides the maximum value (e.g. sum of edge detections) is treated as the best focus point for taking a picture.

Each camera manufacturer, both film and digital, has their own methodologies for edge detection, which may vary from product to product. These various algorithms and methods typically represent the manufacturers' experiences in developing auto focus for their particular products. However, in a typical auto focusing methodology, auto focus algorithms seek to optimize edge contrast. Auto focusing is typically carried out by calculating an FOM multiple times during lens focus to find the optimal lens focus position and the auto focus FOM is typically calculated on a subset of the entire image represented by the aforementioned region. Problematically, at the boundary of this region, or focus window, a high contrast edge may move in and out of the focus window between frames, providing inconsistent FOM calculation results, frame to frame.

Typically, in order to save component cost, cameras will only evaluate pixels in a streaming manner for edge detection. Whereas pixels are read out of a CCD in horizontal lines, buffer memory is necessary in order to evaluate vertical pixels. By only using horizontal pixels for edge detection less memory is needed for buffering. Depending on the complexity of the edge detector employed multiple line buffers may be required to provide vertical, or diagonal, edge detection, fairly dramatically increasing the cost of an edge detector. Therefore, typical existing FOM calculation processes tend to only evaluate pixels as presented in a stream as horizontal pixels.

SUMMARY

An embodiment of a method comprises detecting edges in at least a region of a captured focus image, using adjacent pixels of the region to obtain first edge detection results and filtering the first edge detection results. The first filtering comprises comparing differences in pixel contrast in the first edge detection results with a first threshold value and removing the differences in pixel contrast that are less than the first threshold value from the first edge detection results. The method further comprises detecting edges in at least the region, using non-adjacent pixels of the region to obtain second edge detection results and filtering the second edge detection results. The second filtering comprising comparing differences in pixel contrast in the second edge detection results with a second threshold value and removing the differences in pixel contrast that are less than the second threshold value from the second edge detection results.

An embodiment of a system comprises captured image data for at least one focus position of an imaging device, a first edge detector that calculates contrast differences of adjacent orthogonal pixels of a focusing region of the captured image, a first comparator that compares differences in pixel contrast in results provided by the first edge detector with a first threshold value, a first multiplexer removing the differences in pixel contrast that are less than the first threshold value from the results provided by the first edge detector, a second edge detector that calculates contrast differences of non-adjacent pixels of the focusing region of the captured image, in parallel with operation of the first edge detector, a second comparator that compares differences in pixel contrast in results provided by the second edge detector with a second threshold value, and a second multiplexer removing the differences in pixel contrast that are less than the first threshold value from the results provided by the second edge detector.

DETAILED DESCRIPTION

Figure 1:
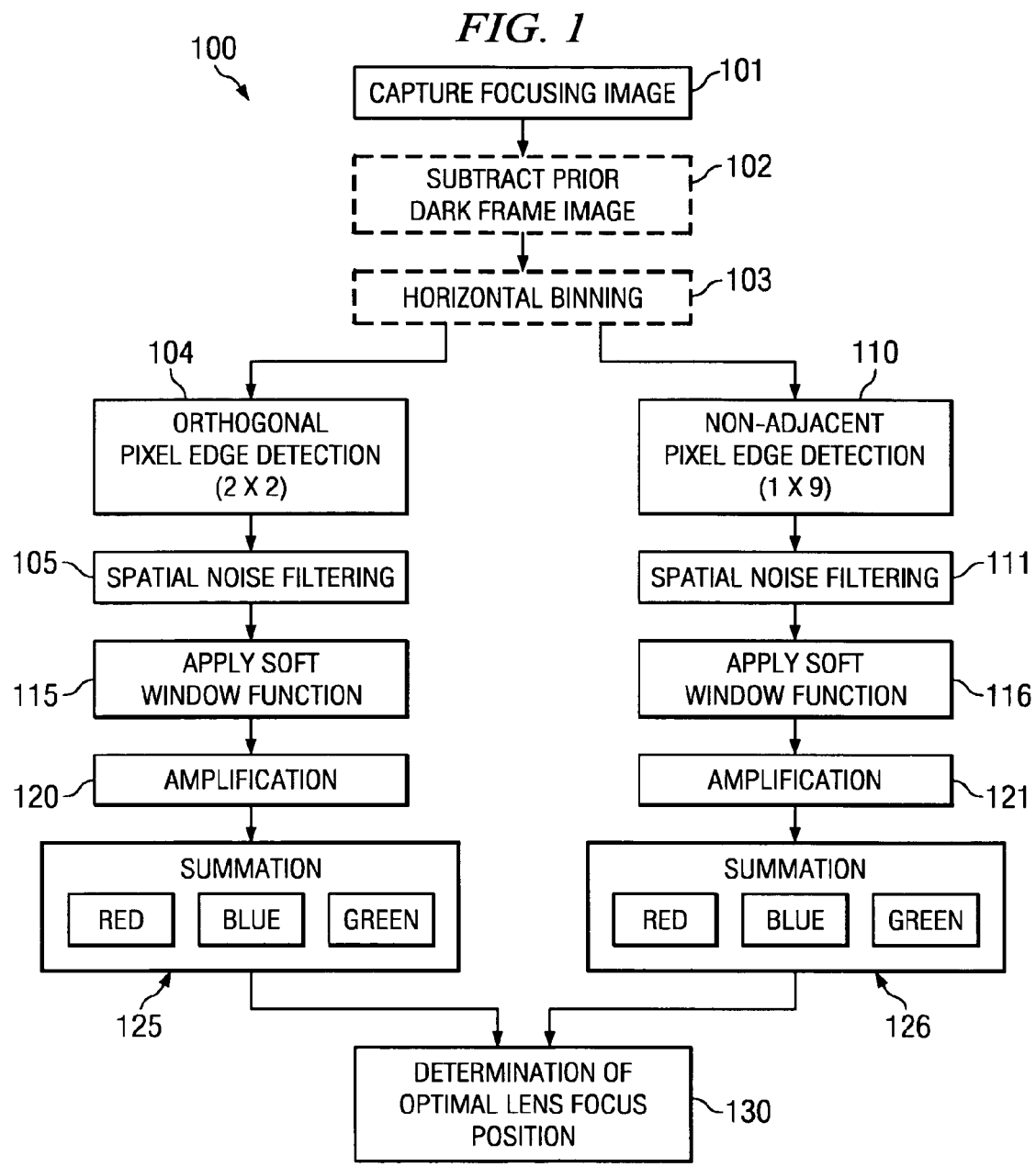
FIG. 1 is flow chart of operation of an embodiment of the present methods.

FIG. 1 is a flow chart of embodiment 100 of a method for arriving at an auto focus Figure of Merit (FOM) for digital cameras. A focusing image is captured at 101 in a manner well known to those of ordinary skill in the art. Embodiments of the present systems and methods may employ a subtraction of a prior dark frame to remove dark noise from a focusing image prior to FOM calculations. Thus, at 102 an optional prior dark frame subtraction is carried out on the image captured at 101. A dark image previously captured with the shutter closed on the CCD gathers whatever electron well collection that is occurring in the absence of the light. Optional prior dark frame subtraction 102 removes a dark image from the CCD captured focusing image. Preferably, the dark frame image that is subtracted from the focusing image was taken at the same exposure settings as the focusing image.

The present systems and methods may also employ pixel binning to remove focusing image noise, particularly in low light situations. This has the advantage of increasing the signal-to-noise ratio of focusing images for FOM calculations. At 103 horizontal binning may optionally be employed to remove noise from the focusing image captured at 101. Optional horizontal binning 103 is a technique by which a signal, which is generally a common signal across multiple pixels, can be combined or binned together to amplify the signal and reduce noise, because noise tends to be random and it tends to cancel-out across multiple pixels. Horizontal binning 103 may be used in relatively low light situations and/or to compensate for shorter exposure times, or the like, increasing a signal-to-noise ratio of the image.

A first set of FOM pixel contrast difference edge detection calculations are carried out at 104. These FOM calculations may be carried out on adjacent horizontal, vertical, and/or diagonal pixels, but are carried out at least on orthogonal pixels. By way of example, horizontal and vertical difference calculations, or alternative multiply and accumulate operations, may be used to apply edge detection. In accordance with the present systems and methods, a difference function of pixels, such as the difference between two horizontal pixels and/or the difference between two vertical pixels, may be used to apply edge detection. In accordance with embodiments of the present systems and methods, a difference algorithm subtracts horizontal pixels and then subtracts vertical pixels to provide the aforementioned orthogonal edge detection. By analyzing edges in orthogonal space, such as by looking at pixels that are either horizontal or vertical, or diagonal to the left or diagonal to the right such that two dimensions may be employed for focusing, the present systems and methods may enhance the likelihood of capturing an edge in a focusing image of any given scene.

Following edge detection, embodiments of the present systems and methods may employ spatial noise filtering to programmatically remove small differences, or deltas, in an image, which might erroneously indicate an edge. Filtering out the noise in the image improves the accuracy of subsequent FOM calculations. By way of example, at 105 small pixel differences are filtered out of the FOM calculations resulting from step 104 by comparing the results of FOM difference operation 104 to a programmable threshold, thereby carrying out spatial noise filtering of the FOM image. Spatial filtering 105 enables small differences falling within a noise threshold in the focusing image captured at 101 to be ignored. Thus, spatial noise filtering is particularly applicable where a signal, or the like, has a lot of small differences, or where it is known that a great amount of low-level noise will be present. In the case of an auto-focus FOM, large differences, indicating edges, are being sought. In accordance with the present systems and methods, a comparator circuit may be used to remove small differences from a captured focus image by only retaining differences that are greater than some threshold value. As discussed in greater detail below, embodiments of the present systems and methods may employ a comparator and a multiplexer (MUX), relatively inexpensive components. In a software embodiment of the present systems and methods a similar function may be carried out by a spatial filter, executed by a processor.

The present systems and methods may also employ a second edge detection calculation, which may be calculated on non-adjacent pixels to facilitate determination of the proper focus position for the associated camera and may be carried out in parallel with first edge detection 104. For example, in parallel with FOM calculations 104 and spatial noise filtering 105, second, predictive, FOM pixel difference edge detection calculations 110 may be carried out on the focusing image captured at 101. Second FOM calculations 110 may be carried out on non-adjacent pixels. Comparison of separated pixels, such as may be located up to eight pixels apart, may help predict the probable location for the maximum focus FOM, or contrast peak, as a function of various lens focus positions. The second FOM calculations may only be carried out on streamed non-adjacent pixels in the horizontal direction. Second horizontal FOM 110 enhances and/or allows a level of prediction by changing the shape of the focus contrast peak as a function of lens position. As a result, the existence of, and direction to, a focus contrast peak can be determined at lens positions further from the maximum focus contrast lens position than would otherwise be possible using adjacent pixel edge detection alone. At 111 small pixel differences may be filtered out by comparing the results of second FOM calculations from 110 to a programmable threshold, thereby carrying out further spatial noise filtering of the FOM image. Spatial filtering 111, as with spatial noise filtering 105, also enables small differences falling within a noise threshold in the focusing image captured at 101 to be ignored and may be implemented using a comparator and a MUX.

The present systems and methods may also employ a soft window function, similar to as disclosed in now abandoned U.S. patent application Ser. No. 09/880,496, entitled METHOD AND APPARATUS FOR FOCUS ERROR REDUCTION IN A CAMERA, filed Jun. 13, 2001, AND PUBLISHED Dec. 19, 2002 as U.S. Pub. No. US 2002/0191973, the disclosure of which is incorporated herein by reference thereto. This soft window function might be used to reduce the weight of edge pixel differences, to account for edges moving in and out of the focus window, or focusing region, between the capture of focusing images. This has the effect of "discounting" sharp edges at the boundary of the focusing window. For example, at 115 and 116 a soft window function may be applied to the output of each of parallel FOM calculations 104 and 110, and the respective spatial noise filterings 105 and 111 associated with each calculation. Since focus images are gathered over time, by capturing multiple instances of frames, such as the frame captured at 101, it is possible that at the edge of the focus frame or region of the image, objects will be moving in and out of the focus frame, which may result in an erroneous focus figure of merit, and bad focus. Soft window functions 115 and 116 remove or attenuate edge objects so that such false readings will be minimized.

Whereas in edge detection small differences may not be as significant as large differences, an amplification function may be employed at 120 and 121, such as before contrast difference summation at 125 and 126. Amplification 120 and 121 my be carried out by squaring contrast differences resulting from edge detection, and/or application of other amplification functions such as logarithms or exponents to the contrast differences resulting from edge detection. Amplification 120 and 121 is intended to amplify large contrast differences and minimize small contrast differences. As discussed in greater detail below, Lookup Tables (LUTs) may be used to square contrast differences resulting from edge detection or to apply any other sort of amplification function such as logarithms or exponents to the contrast differences resulting from edge detection.

At 125 and 126 the results of amplification 120 and 121 maybe summed for each color of pixel, separately. As discussed below, this summation may be carried out using accumulators. Whereas existing FOM systems typically only employ green pixels, since green pixels are the primary component of image luminance, the present systems and methods uses all colors of pixels. Hence, the different color pixels may be summed separately at each of 125 and 126, providing an FOM result for each color. A camera system employing method 100 may read the FOM results to determine the optimal position of the lens focus element at 130, such as through comparison of the calculated FOM results from multiple focus frames taken a different lens focus positions.

Figure 2:
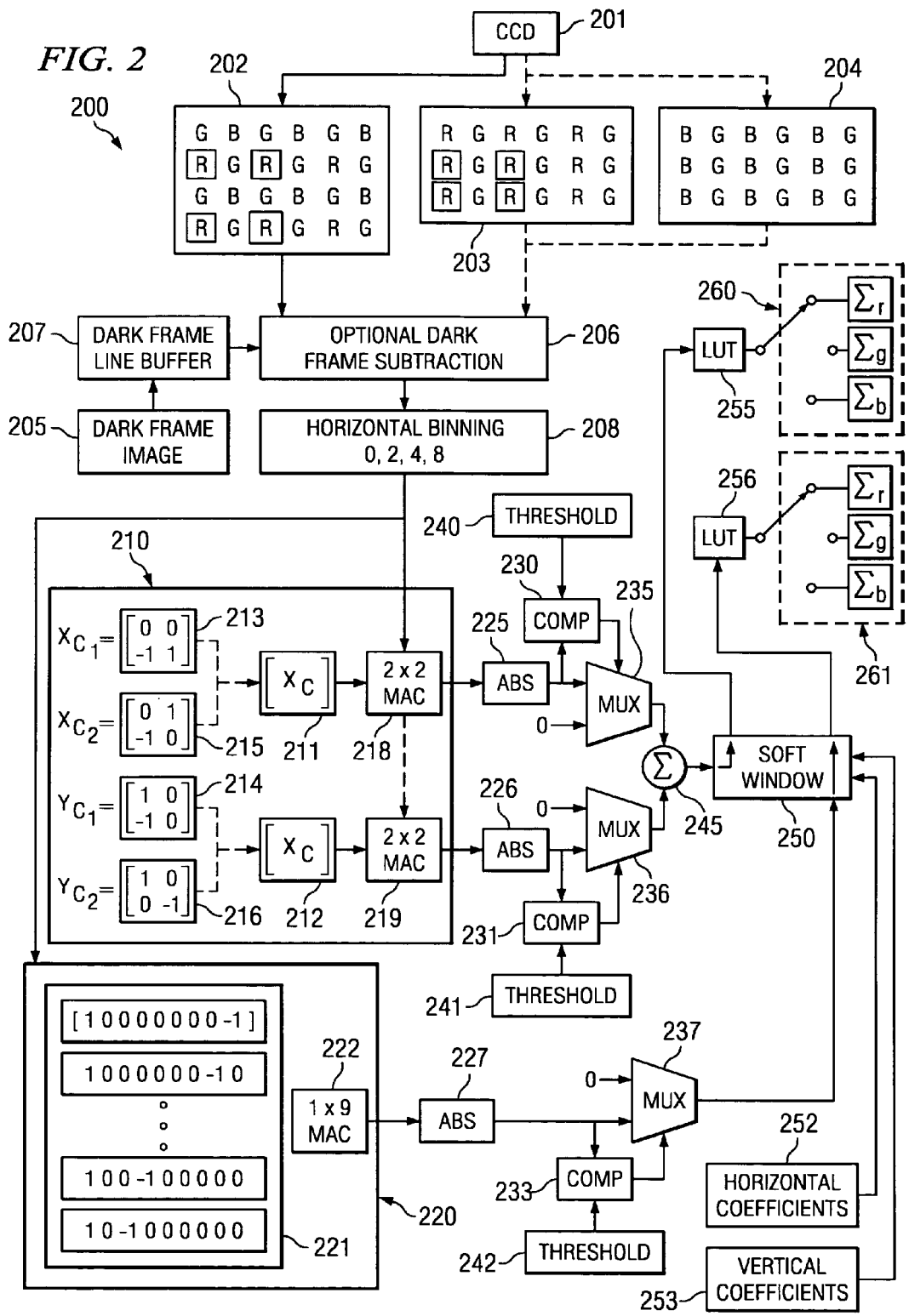
FIG. 2 is a diagrammatic illustration of operation of an embodiment of the present systems and methods.

FIG. 2 is a diagrammatic illustration of implementation embodiment 200 of the present systems for arriving at an auto focus figure of merit for digital cameras. As noted above, auto focus in digital cameras employ an edge detector, typically using image pixels in a horizontal line of CCD output. Typically, a combination of software and hardware may be used to provide edge detection in existing cameras. The present systems and methods may be implemented as software in a processor or in a hardware implementation. For example, the present systems and methods might be implemented as an algorithm to be run on a processor. However, it may be more advantageous to implement the present systems and methods, very inexpensively, in hardware.

CCD 201 may provide image sensor data 202 and/or 203 and 204 for use by the present systems and methods in an interleaved pattern such as a Bayer pattern, in which every other pixel is green (G), such as a Green-Blue (GB) pattern. CCD sensor 201 may employ a set of color filters, so a pixel will be green or blue, providing, as in 202, a line of horizontal pixels having a GBGBGB . . . pattern. A next line of CCD output 202 may have a Red-Green pattern (RGR-GRG). CCD sensor 201 may provide data with twice as many green pixels as blue or red pixels to increase the perceived resolution since the green pixels are the primary contribution to luminance for the image. In accordance with the present systems and methods, different, or alternating, lines of a Bayer pattern may be stored or buffered separately (203 and 204). For example, GB lines 204 may be stored or buffered separately, from RG lines 203 of a same image, for auto focus processing in accordance with the present systems and methods.

The present systems and methods may make use of a previously captured dark frame image 205, such as may be taken by the sensor with the camera's shutter closed. As discussed above, this dark frame image provides dark performance of the sensor, which can be integrated into an image at the sensor. CCD 201 may collect electrons in its wells even in the absence of light, noise resulting from these erroneously collected electrons, referred to as fixed pattern noise, may be filtered out by dark frame subtraction 206. Dark frame image 205 may be provided via dark frame line buffer 207. In low light situations the pixels present in a dark frame can correlate to a significant portion of the actual image data captured. Therefore, in accordance with the present systems and methods, the previously stored dark frame may be subtracted from a captured focus frame to account for or compensate for fixed pattern noise that may be present in long exposure situations. Whereas the present systems and methods preferably uses more than horizontal pixel edge detection employing immediately adjacent pixels, the present systems and methods already employs line buffering. Therefore, dark frame line buffer 207 may be used to carry out dark frame subtraction. For example, an entire line of dark frame data may be subtracted from an entire line of incoming image data line. Such data may be most efficiently stored in memory as complete lines to provide efficient hardware transfer rates as single cycle accesses of DRAM are inefficient. Thus, in camera hardware a line of dark frame image 205 is passed to dark frame line buffer 207, and then as a corresponding line of image data 202 (or 203 and 204) is received, the corresponding dark frame data for that line is subtracted at 206.

The present systems and methods may make use of horizontal binning 208 to improve the signal-to-noise ratio in an image. Binning 208 combines a number of adjacent same color pixels, such as up to eight pixels, together, prior to further FOM processing. Therefore, in horizontal binning of Bayer patterned data every-other pixel of a line of data may be binned. In the case of horizontal binning, this binning is carried out on horizontally adjacent pixels. In a low light situation where images have a low signal-to-noise ratio, binning pixels can provide a better signal-to-noise ratio, particularly for FOM calculations.

In FIG. 2, coefficient based difference functions may be implemented by convolving two sets of coefficients, or kernels, using pixels in two orthogonal spaces, such vertical and horizontal pixels, from the input sensor data to provide edge detection 210. Multiply and accumulate operations (MAC), such as each of 2×2 MACs 218 and 219, may be used to perform a convolution of its respective kernel, 211 and 212, with the CCD sensor data. As a result, the CCD sensor data may be simultaneously convolved with kernel Xc 211 by 2×2 MAC 218, and kernel Yc 212 by 2×2 MAC 219. For example, programmable kernels, Xc 211 and Yc 212 may be programmed as shown in 2×2 matrixes 213 and 214, or as shown in 2×2 matrixes 215 and 216. Difference operations embodied in 2×2 matrixes 213/214 and 215/216 may be implemented to provide edge detection 210 using horizontal and vertical pixels in two orthogonal spaces. In accordance with the present systems and methods, edge detection 210 may operate horizontally, vertically and/or diagonally, as desired. In one example, 2×2 matrix kernels $Xc_1$ 213 and $Yc_1$ 214 may be used for vertical and horizontal edge detection, while in another example, 2×2 matrix kernels $Xc_2$ and $Yc_2$ may be used for left and right diagonal edge detection. Thus, the present systems and methods may analyze edges in orthogonal space by using sets of pixels that are either disposed horizontally and vertically to each other, or diagonal to the left or diagonal to the right relative to each other, such that two dimensions may be employed for focusing, enhancing the likelihood of capturing an edge in a focusing image of any given scene.

Second parallel edge detector 220 may employ 1×9 edge detectors 221 or 222, which may be implemented as a difference function as well. The distance between pixels may be chosen based on the type of image to be taken. Thus, an algorithm governing operation of the present systems and methods may make the choice of pixel separation to be used at 221 or 222. For example, if a camera employing the present systems and methods is performing a coarse or fast focus position search, a particular pixel separation setting may be chosen for use at 221 or 222, while a different pixel separation might be used when performing a fine or accurate focus position search. The pixel separation employed may have an effect on how much noise filtering is carried out by subsequent noise filtering, discussed below. Also, the degree of binning 208 may effect the selection of pixel separation used at 221 or 222. For example, a greater degree of binning might not facilitate use of greater pixel separation at 221 and 222, while less binning might compliment use of greater pixel separation at 221 or 222. Although FIG. 2 only shows horizontal 1×9 edge detection, 1×9 edge detection may also be used to detect orthogonal horizontal and vertical or orthogonal diagonal pixel contrast differences, in accordance with the present systems and methods.

At 225 and 226 the absolute values of the horizontal and vertical edge detections 210 respectively, may be taken. Similarly, the absolute values of the output of second parallel edge detector 220 may be taken at 227. Negative or positive horizontal and vertical edge detections would indicate left to right or right to left edges. The difference, or degree of difference, of edge contrast would result after taking the absolute values of the horizontal and vertical edge detections 210 and second parallel edge detection 220.

Inexpensive initial noise or spatial filtering may be carried out using digital comparator 230, 231 or 232, and respective digital multiplexer (MUX) 214, 215 or 223, acting as a switch. The output absolute values from 225, 226 and 227 may be compared to a threshold value 240, 241 and 242 by respective comparators 230, 231 and 233. Threshold values 240, 241 and 242 may be a same or differing values, such as may be based on camera settings, A/D gain, CCD temperature, or estimated CCD noise levels. If an output absolute value is below the respective threshold value, it may be replaced with a zero in the data stream, or otherwise reduced.

The filtered first edge detection data exiting multiplexers 235 and 236 is combined in accumulator 245. Since whether an edge is vertical or horizontal may be of little consequence, the data may be combined through summation in accumulator 245. Whereas the present systems and methods examine differences between pixels, no pixel differences are double counted by such a summation.

Soft window function 250 is then applied to summed data from accumulator 245 and data from filtered second edge detection exiting from multiplexer 237. Soft window function 250 attenuates edges detected near the border of a focus frame and may be applied separately, and possibly in different manners, to the filtered results of the first and second edge detections. Soft window function 250 is intended to protect against camera shake and the like. This soft window function may be accomplished by employing a programmable curve. Thus, a number of horizontal and vertical attenuation coefficients 252 and 253, respectively, may be applied at 250 to provide the soft window function. By way of example, only ten percent of the signal of a first row or column of pixels near an edge of the focus window may be used, while twenty percent of the signal from a second row or column of pixels may be retained and thirty percent of a third row or column of pixels may be used, etc. Soft window coefficients 252 and 253 may vary for different camera settings. Additionally, the degree of attenuation may be a function of horizontal binning 205, since a greater degree of binning of pixels tends to effectively widen the focus window. The example coefficients depicted in FIG. 1 are representative of application of the coefficients within a number of pixels of any edge of the focus window. For example, a given number of coefficients may be applied to a like number of pixels, with the coefficients applied in mirror order to opposite edges of the window. Coefficients 252 and 253 may reflect a square function, an exponential decay or whatever type of function that may be appropriate, particularly for an associated camera's settings.

In accordance with the present systems and methods, edge detection is intended to amplify extreme pixel contrast differences that may indicate an edge. Whereas in edge detection small differences may not be as significant as large differences, the present systems and methods might employ a squaring function to amplify large contrast differences and minimize small contrast differences. Lookup tables 255 and 256 may be used to square contrast differences resulting from first and/or second edge detections, respectively, or to apply any other sort of amplification function such as logarithms or exponents to the contrast differences resulting from first and /or second edge detections. As one of ordinary skill in the art will appreciate, different manners for providing amplification of contrast differences may be employed. However, for hardware implementation, amplification functions may be implemented in a lookup table such as lookup tables 255 and 256, as lookup tables are efficiently implemented in terms of memory usage and gate area in a piecewise linear interpolated lookup table. Lookup table 255 and 256 may be 16 piecewise linear interpolated tables or the like, which are more efficient, employing less memory to maintain, than fully populated lookup tables, whereas calculation of piecewise segments uses less memory than a fully populated table. Such a piecewise linear interpolation approximates a function by a series of straight lines and a LUT may employ a point and slope or two end points for calculations. As illustrated, multiple LUTs may be used in accordance with the present systems and methods. Thereby, a different squaring function may be applied to the results of each of 2×2 differential edge detection and 1×9 edge detection.

To effect contrast difference summation, each color of each set of pixels output by LUTs 255 and 256 may be summed by accumulators 260 and 261, respectively, to provide a figure of merit to be used by the camera in a determination of the proper focus position. Accumulators 260 and 261 separately sum the different colored pixels resulting from application of LUTs 255 and 256, respectively. As noted above, existing FOM systems typically only employ green pixels, since green pixels are the primary component of image luminance. However, the present systems and methods make use of all colors of pixels. Thus, the different colored pixels resulting from application of LUTs 255 and 256 are separately summed in accumulators 260 and 261 to provide an FOM result for each color. Summation will aid in determining the presence of an edge as an auto focus process employing the present systems and methods steps through all the focal planes. The lens position providing the sharpest, and thereby greatest pixel contrast difference will be amplified by LUTs 255 and/or 256 and result as a peak upon summation in accumulators 260 and/or 261 as the resulting FOM is plotted over lens focus positions. The focus FOM resulting in accumulators 260 and 261 may reach a maximum, or a peak, at the sharpest focus position when observed over the range of lens focus positions. These focus FOMs may be used by a camera system's focus search algorithm to locate the focus FOM peak to arrive at the sharpest or best focus position. Any number of search algorithms may employed to evaluate the FOMs. For example, a peak search algorithm, such as a "hill climbing" algorithm may be employed to compare the FOMs from accumulators 260 and 261 from multiple focus frames taken a different lens focus positions to find an optimal lens focus position.

What is claimed is:

1. A method comprising:
   detecting edges in at least a region of a captured focus image, using adjacent pixels of said region to obtain first edge detection results;
   filtering said first edge detection results, the first filtering comprising:

comparing differences in pixel contrast in said first edge detection results with a first threshold value; and removing said differences in pixel contrast that are less than said first threshold value from said first edge detection results;

detecting edges in at least said region, using non-adjacent pixels of said region to obtain second edge detection results;

filtering said second edge detection results, the second filtering comprising:

comparing differences in pixel contrast in said second edge detection results with a second threshold value; and removing said differences in pixel contrast that are less than said second threshold value from said second edge detection results;

applying a soft window that weights pixels of the region to discount sharp edges at boundaries of the region in each of the results provided by the edge detection;

amplifying the results of the filterings;

separately summing the results of the amplifying for each color of pixel; and determining an optimal lens focus position.

2. The method of claim 1 wherein the detecting edges using adjacent pixels and filtering said first edge detection results are carried out in parallel with the detecting edges using non-adjacent pixels and filtering said second edge detection results.

3. The method of claim 1 wherein said detecting edges using adjacent pixels of said region comprises detecting edges using orthogonal pixels of at least said region.

4. The method of claim 3 wherein said orthogonal pixels are horizontal and vertical pixels of said region.

5. The method of claim 3 wherein said orthogonal pixels are diagonal right and diagonal left pixels of said region.

6. The method of claim 1 wherein the filterings are noise filterings.

7. The method of claim 1 wherein each of the filterings are carried out by a comparator circuit and a multiplexer.

8. The method of claim 7 wherein said comparings each comprise a comparator comparing an absolute value of said results of the edge detections with a respective one of the thresholds.

9. The method of claim 1 wherein said first threshold and said second threshold are a same threshold.

10. The method of claim 1 further comprising:

weighting pixels of said region to discount sharp edges at boundaries of said region resulting from the edge detection using adjacent pixels.

11. The method of claim 1 further comprising:

weighting pixels of said region to discount sharp edges at boundaries of said region resulting from the edge detection using non-adjacent pixels.

12. The method of claim 1 further comprising:

subtracting a dark frame image from at least said region of said captured focus image, prior to the edge detections.

13. The method of claim 1 further comprising:

binning pixels of said captured focus image increasing a signal-to-noise ratio of said captured focus image, prior to the edge detections.

14. The method of claim 13 wherein said binning is horizontal binning.

15. The method of claim 1 further comprising:

binning adjacent same-color pixels of said captured focus image increasing a signal-to-noise ratio of said captured focus image, prior to the edge detections.

16. The method of claim 1 wherein:

amplifying the results of the filterings includes amplifying large contrast differences and minimizing small contrast differences.

17. The method of claim 16 wherein said amplifying comprises applying a squaring function to said results of said filterings.

18. The method of claim 16 wherein said amplifying comprises applying one of a logarithmic and exponential function to said results of said filterings.

19. The method of claim 16 wherein said amplifying is carried out using a lookup table.

20. The method of claim 19 wherein said lookup table is a piecewise liner lookup table.

21. The method of claim 1 further comprising:

separately summing the results for each color of pixels for each of said filterings.

22. A system comprising:

captured image data for at least one focus position of an imaging device;

a first edge detector that calculates contrast differences of adjacent orthogonal pixels of a focusing region of the captured image;

a first comparator that compares differences in pixel contrast in results provided by said first edge detector with a first threshold value;

a first multiplexer removing said differences in pixel contrast that are less than said first threshold value from said results provided by said first edge detector;

a second edge detector that calculates contrast differences of non-adjacent pixels of said focusing region of the captured image, in parallel with operation of said first edge detector;

a second comparator that compares differences in pixel contrast in results provided by said second edge detector with a second threshold value;

a second multiplexer removing said differences in pixel contrast that are less than said first threshold value from said results provided by said second edge detector;

an application module configured to apply a soft window that weights pixels of the region to discount sharp edges at boundaries of the region in each of the results provided by the edge detector and amplifies the results of the filterings;

a summation module configured to separately sum the results of the amplification module for each color of pixel; and an optimizer configured to determine an optimal lens focus position.

23. The system of claim 22 wherein said orthogonal pixels are horizontal and vertical pixels of said region.

24. The system of claim 22 wherein said orthogonal pixels are diagonal right and diagonal left pixels of said region.

25. The system of claim 22 wherein said comparators compare an absolute value of said results provided by the respective one of said edge detectors with a respective one of the thresholds.

26. The system of claim 22 wherein said first threshold and said second threshold are a same threshold.

27. The system of claim 22 further comprising:
soft window functionality that weights pixels of said region to discount sharp edges at boundaries of said region in each of the results provided by said edge detectors.

28. The system of claim 22 further comprising:
a dark frame image buffer used in subtracting a prior dark frame image from at least said region of said captured focus image, prior to the contrast difference calculations.

29. The system of claim 22 further comprising:
pixel binning functionality that combines a plurality of adjacent pixels same-color pixels of said captured focus image to increase a signal-to-noise ratio of said captured focus image data, prior to the calculations of pixel contrast differences.

30. The system of claim 22 further comprising:
lookup tables separately amplifying the results provided by each of said multiplexers.

31. The system of claim 30 wherein said lookup tables each apply a piecewise liner calculated function to the respective results provided by each of said multiplexers, said function comprising one of a squaring function, a logarithmic, and exponential function.

32. The system of claim 22 further comprising:
an accumulator that separately sums the results provided by each of said multiplexers for each color of pixels.

33. A system comprising:
means for capturing a series of focusing images, each of said images taken at a focus position of an imaging device, each of said focusing images comprising at least one region of a scene;
means for subtracting a previously captured dark frame image from each of said captured focusing images;
means for increasing a signal-to-noise ratio of each of said captured focusing images by binning adjacent same-color pixels of each of said captured focusing images;
means for differentiating contrast of adjacent orthogonal pixels to detect edges present in each of said captured focusing images;
means for differentiating contrast of non-adjacent pixels of each of said captured focusing images to detect edges present in said captured focusing images, in parallel with said means for differentiating contrast of adjacent orthogonal pixels;
means for filtering noise from the results provided by each of the means for differentiating adjacent and non-adjacent pixels;
means for weighting pixels in the results of the filterings to discount sharp edges at boundaries of each of said focusing images;
means for amplifying the results of the pixel weightings;
means for accumulating the amplified results for each color of pixels of each of said focusing images; and
means for determining an optimal lens focus position.

34. The system of claim 33 wherein said means for filtering comprises:
means for comparing absolute values of differences in pixel contrast in said results provided by each of said means for differentiating with a threshold; and
means for multiplexing said results to remove said differences in pixel contrast that are less than said threshold.

35. The system of claim 33 wherein said means for weighting comprising means for applying multiple coefficients to results of said filterings.

36. The system of claim 33 wherein said means for amplifying comprises means for applying a piecewise liner calculation to results provided by said pixel weightings.

* * * * *